(12) United States Patent
Wolfe et al.

(10) Patent No.: US 8,146,744 B2
(45) Date of Patent: Apr. 3, 2012

(54) BLISTER PACK ASSEMBLIES WITH LENTICULAR LENSES

(75) Inventors: James Wolfe, Los Angeles, CA (US); Van Dickranian, La Crescenta, CA (US)

(73) Assignee: Mattel, Inc., El Segundo, CA (US)

( * ) Notice: Subject to any disclaimer, the term of this patent is extended or adjusted under 35 U.S.C. 154(b) by 1230 days.

(21) Appl. No.: 11/423,074

(22) Filed: Jun. 8, 2006

(65) Prior Publication Data

US 2006/0283749 A1   Dec. 21, 2006

Related U.S. Application Data

(60) Provisional application No. 60/689,583, filed on Jun. 10, 2005.

(51) Int. Cl.
 B65D 73/00 (2006.01)
 G03B 21/60 (2006.01)
(52) U.S. Cl. ........................ 206/462; 359/455
(58) Field of Classification Search ............... 206/459.1, 206/459.5, 457, 461–462, 464–465, 471; 359/619, 621, 454, 455, 623, 627; 40/454
 See application file for complete search history.

(56) References Cited

U.S. PATENT DOCUMENTS

| | | | |
|---|---|---|---|
| 3,357,772 A | 12/1967 | Rowland | |
| 3,475,521 A | 10/1969 | Stroop | |
| 3,476,239 A * | 11/1969 | Yuash | 206/461 |
| 3,538,198 A | 11/1970 | Montebello | |
| 3,565,733 A | 2/1971 | Leach | |
| 3,594,457 A | 7/1971 | Wright | |
| 3,673,295 A | 6/1972 | Winchklhofer et al. | |
| 3,786,932 A | 1/1974 | Smith | |
| 3,800,016 A | 3/1974 | Roberts | |
| 3,935,358 A | 1/1976 | Wyeth et al. | |
| 3,955,019 A | 5/1976 | Keith | |
| 3,982,877 A | 9/1976 | Wyeth et al. | |
| 4,034,555 A | 7/1977 | Rosenthal | |
| 4,129,628 A | 12/1978 | Tamutus | |
| 4,192,701 A | 3/1980 | Martin et al. | |
| 4,212,836 A | 7/1980 | Wu | |
| 4,239,727 A | 12/1980 | Myers et al. | |
| 4,319,684 A * | 3/1982 | Backman et al. | 206/464 |
| 4,498,736 A | 2/1985 | Griffin | |
| 4,528,260 A | 7/1985 | Kane | |
| 4,541,727 A * | 9/1985 | Rosenthal | 368/232 |
| 4,767,186 A | 8/1988 | Bradley, Jr. et al. | |
| 4,840,275 A * | 6/1989 | Faiola et al. | 206/423 |
| 4,935,335 A | 6/1990 | Fotland | |
| 5,000,805 A | 3/1991 | Lowe | |
| 5,300,263 A | 4/1994 | Hoopman et al. | |
| 5,439,621 A | 8/1995 | Hoopman | |
| 5,494,445 A * | 2/1996 | Sekiguchi et al. | 434/365 |
| 5,500,157 A | 3/1996 | Graebner et al. | |
| 5,519,539 A | 5/1996 | Hoopman et al. | |
| 5,525,383 A * | 6/1996 | Witkowski | 428/30 |
| 5,571,598 A | 11/1996 | Butler et al. | |
| 5,623,368 A | 4/1997 | Calderini et al. | |

(Continued)

*Primary Examiner* — Luan K Bui
*Assistant Examiner* — Chun Cheung
(74) *Attorney, Agent, or Firm* — Kolisch Hartwell, PC (57) ABSTRACT

Blister pack assemblies include a blister pack and a lenticular lens member. The blister pack includes a blister card, a blister attached to the blister card, and indicia of lenticular art. The lenticular lens member is attached to the blister pack and includes a lenticular lens array functionally aligned with the indicia of lenticular art.

8 Claims, 7 Drawing Sheets

U.S. PATENT DOCUMENTS

| | | | | |
|---|---|---|---|---|
| 5,642,226 | A | 6/1997 | Rosenthal | |
| 5,833,068 | A * | 11/1998 | Fantone | 206/459.1 |
| 5,896,230 | A | 4/1999 | Goggins | |
| 5,953,170 | A | 9/1999 | Glancy | |
| 6,046,855 | A | 4/2000 | Goto | |
| 6,084,713 | A | 7/2000 | Rosenthal | |
| 6,256,149 | B1 | 7/2001 | Rolfe | |
| 6,256,150 | B1 | 7/2001 | Rosenthal | |
| 6,341,189 | B1 | 1/2002 | Deacon | |
| 6,414,794 | B1 | 7/2002 | Rosenthal | |
| 6,596,361 | B2 * | 7/2003 | Klein et al. | 428/42.3 |
| 6,688,649 | B2 * | 2/2004 | Casagrande | 283/61 |
| 6,751,024 | B1 | 6/2004 | Rosenthal | |
| 6,781,761 | B2 | 8/2004 | Raymond | |
| 6,984,425 | B2 * | 1/2006 | Raymond | 428/35.7 |
| 6,995,913 | B2 * | 2/2006 | Goggins | 359/619 |
| 2002/0110658 | A1 | 8/2002 | Lucke et al. | |
| 2002/0150748 | A1 | 10/2002 | Delusky et al. | |
| 2003/0062640 | A1 | 4/2003 | Ansell et al. | |
| 2003/0214080 | A1 | 11/2003 | Maki et al. | |
| 2004/0070836 | A1 | 4/2004 | Rosenthal | |
| 2004/0195732 | A1 | 10/2004 | Fitzell, Jr. | |
| 2006/0138009 | A1 * | 6/2006 | Bozkurt | 206/467 |

* cited by examiner

BLISTER PACK ASSEMBLIES WITH LENTICULAR LENSES

CROSS-REFERENCE TO RELATED APPLICATIONS

This application is based upon and claims priority under 35 U.S.C. §119(e) to the following U.S. provisional application, which is incorporated herein by reference in its entirety for all purposes: Ser. No. 60/689,583, entitled "Blister Packaging with Lenticular Lens," filed on Jun. 10, 2005.

BACKGROUND

The present disclosure relates generally to blister packaging, and more particularly to blister packaging incorporating lenticular lenses.

Blister packaging is often used to package and display merchandise. A blister pack typically includes a transparent piece of plastic ("the blister") molded or otherwise formed to define a cavity generally in a shape corresponding to or larger than the particular merchandise to be packaged, and a sheet of paperboard heat-sealed or glued to the blister, such that merchandise is contained within the cavity of the blister. The sheet of paperboard, also referred to as a blister card, often contains graphics and text related to the merchandise.

Blister packs may also include a filler blister and/or a paperboard insert. A filler blister is a formed piece of plastic similar to a blister, but is typically used inside of the blister to aid in the positioning of and the securing of the merchandise between the blister and the blister card. A paperboard insert, like the blister card, often includes graphics and text related to the merchandise, and may be contained within the cavity along with the merchandise.

Lenticular lenses are used to create multiple image effects. A lenticular lens is typically a transparent sheet containing an array of several elongated, parallel lens elements called lenticules. When a lenticular lens is placed over a printed picture made up of several bands of two or more images appropriately interlaced with one another, the different images are exhibited individually when the combination is viewed at different angles. One example of lenticular lens use is with novelty baseball cards. For example, when viewed at one angle, an image of a baseball player at the start of his swing is exhibited; when viewed at a second angle, an image of the baseball player in the middle of his swing is exhibited; and when viewed at a third and final angle, an image of the baseball player concluding his swing is exhibited. An illusion of the baseball player making a complete swing is created when the three images are viewed in sequence.

Examples of lenticular and other lenses, including methods of making such lenses, are disclosed in U.S. Pat. Nos. 6,781,761, 6,751,024, 6,414,794, 6,256,150, 6,256,149, 6,091,482, 6,084,713, 6,046,855, 5,896,230, 5,714,218, 5,647,151, 5,642,226, 5,623,368, 5,588,526, 5,554,432, 5,519,539, 5,500,157, 5,544,741, 5,439,621, 5,330,799, 5,300,263, 5,298,366, 4,935,335, 4,767,186, 4,528,260, 4,498,736, 4,541,727, 4,420,221, 4,414,316, 4,129,628, 4,034,555, 3,706,486, 3,594,457, 3,584,369, 3,565,733, 3,538,198, 3,357,772, and 3,146,492, and U.S. Pat. Pub. Nos. 2004/0070836, 2003/0214080, and 2004/0195732, the entire disclosures of which are incorporated herein by reference in their entirety for all purposes.

SUMMARY

Blister pack assemblies for displaying merchandise including a blister pack and a lenticular lens member are provided. The blister pack includes a blister card, a blister attached to the blister card, and indicia of lenticular art. The blister includes a cavity configured to retain the merchandise. The lenticular lens member is attached to the blister pack and includes a lenticular lens array functionally aligned with the indicia of lenticular art. In some embodiments, the indicia of lenticular art are printed on the blister card. In other embodiments, the blister pack includes an insert, on which the indicia of lenticular art are printed.

DETAILED DESCRIPTION

Figure 1:
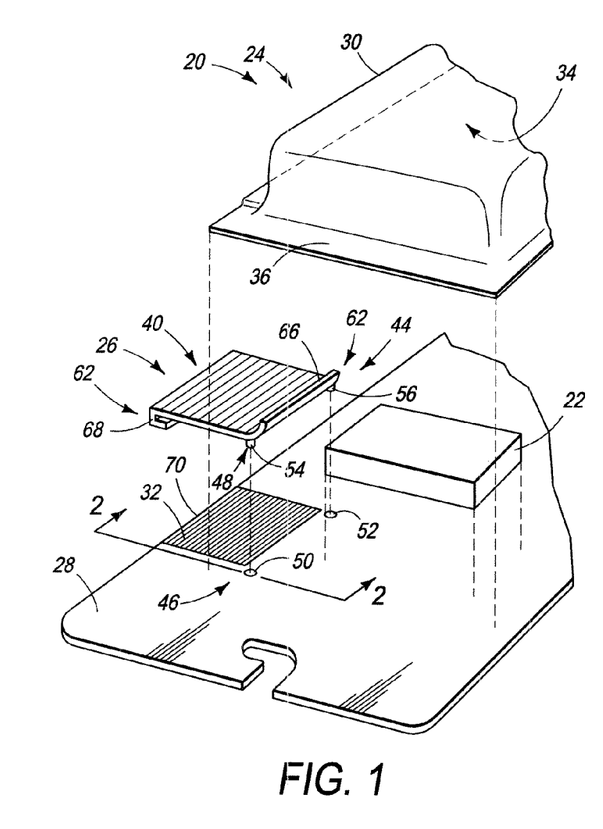
FIG. 1 is a fragmentary isometric exploded view of an embodiment of a blister pack assembly.
Figure 2:
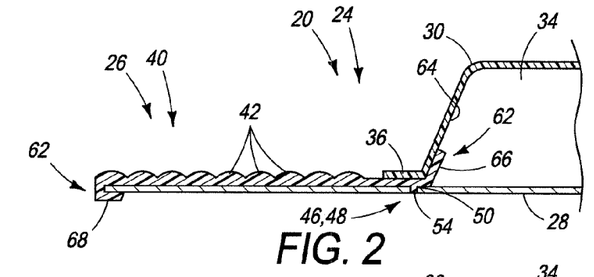
FIG. 2 is a fragmentary cross-sectional side elevation view of the embodiment of FIG. 1, taken generally along line 2-2 in FIG. 1.

Referring initially in FIGS. 1 and 2, one embodiment of a blister pack assembly 20 is shown in an exploded view and cross-sectional view, respectively. Merchandise packaged within blister pack assemblies 20 may take a variety of forms and are generically shown in the figures at 22. As shown, assembly 20 includes a blister pack 24 and a lenticular lens member 26. Blister pack 24 includes a blister card 28, a blister 30, and indicia of lenticular art 32 imprinted on blister card 28. Lenticular lens member 26 may be attached to blister pack 24 in a variety of configurations such that lenticular lens member 26 is functionally aligned with lenticular art to produce multiple image effects when viewed at different angles.

Blister card 28 may be cardboard, paperboard, or any other suitable material configured to provide a generally rigid backing for blister 30. Typically, blister card 28 is paperboard, die-cut in a shape suitable for functional display of the packaged merchandise, for example including a crooked slot for hanging blister pack assemblies 20 on standard retail hook systems.

Blister 30 may be made of PVC, transparent plastic, or any other material suitably formed into an appropriate configuration for the particular merchandise being packaged, and may be transparent, translucent, or opaque. Blister 30 may be thermo-formed, vacuum-molded, pressed, or formed with any other suitable method to define a cavity 34 configured to retain merchandise 22. Cavity 34 may take a variety of shapes and forms suitable for the particular merchandise being packaged and displayed.

Blister 30 may be attached to the blister card in any suitable method. For example, blister card 28 may include a blister flange 36 extending generally peripherally about the cavity and configured to be heat-sealed to blister card 28 (e.g., heat may be applied by means of a heat-conducting material to a heat-sealing zone of the blister card corresponding to the flange of the blister). In other embodiments, blister flange 36 may be stapled to, glued to, or attached using any suitable method to blister card 28.

Indicia of lenticular art 32 includes narrow bands of two or more images appropriately interlaced with one another, as is well known in the art. For example, indicia 32 may include interlaced narrow bands of two or more photographs functionally aligned with the lenticular lens member, such that the photographs are individually viewed as a whole from different angles. As shown in the embodiment illustrated in FIGS. 1 and 2, indicia 32 may be printed on blister card 28; however, indicia 32 may also be printed on any suitable structure functionally aligned with lenticular lens member 26. Indicia 32 may be imprinted using any suitable method. For example indicia 32 may be (but is not required to be) litho-printed.

Lenticular lens member 26 may be a distinctly separate structure from blister 30 as illustrated in FIG. 1, and typically includes a lenticular lens array 40 made up of several parallel lens elements, or lenticules, 42. Lenticular lens member 26 may be made using a variety of suitable methods and materials suitable for functional configuration of lenticular lens array 40. For example, lenticular lens member 26 may be injection molded from high-optical clear PVC or other plastic. Lenticular lens member 26 may be attached to blister pack 24 in a variety of methods such that lenticular lens array 40 is functionally aligned with indicia 32, as will be discussed in more detail below in reference to the various depicted embodiments.

Still referring to the embodiment of blister pack assembly 20 illustrated in FIGS. 1 and 2, blister card 28 and lenticular lens member 26 may include registration elements 44, such that functional alignment of lenticular lens array 40 with indicia 32 is at least in part maintained by the registration, or mating, of registration elements 44. For example, blister card 28 may include at least a first registration element 46, and lenticular lens member 26 may include at least a corresponding second registration element 48 in registration with at least first registration element 46.

The registration elements of blister card 28 may be in the form of first and second registration holes 50, 52, and the registration elements of lenticular lens member 26 may be in the form of first and second registration pins 54, 56, and configured to register, or mate, with holes 50, 52, respectively. Blister card 28 and lenticular lens member 26, however, may have any suitable number of registration elements 44 such that proper registration of the elements functionally aligns indicia 32 with lenticular lens array 40.

Pins 54, 56 may be generally cylindrical in shape, and holes 50, 52 may be generally circular in cross-section with a diameter generally corresponding to pins 54, 56, respectively. In some embodiments, the diameter of holes 50, 52 may be slightly smaller than the diameter of pins 54, 56 such that a press-fit configuration is created when the pins are mated with the holes. As discussed, the mating of the pins with the holes may at least in part maintain the functional alignment of lenticular lens array 40 with indicia 32.

Lenticular lens member 26 may also include (but is not required to include) one or more retaining elements 62 configured to retain lenticular lens member 26 to blister pack 24 such that lenticular lens member 26 cannot be easily removed while blister 30 remains attached to blister card 28 (i.e., retaining element 62 may generally restrict removal of lenticular lens member 26 until a consumer, or other user, opens blister pack 24 for removal of merchandise 22).

A retaining element 62 may be in the general form of a flange, or other suitable structure, 66 that extends within cavity 34 and engages an inside surface 64 of cavity 34. Thus, attachment of lenticular lens member 26 to blister pack 24 may be at least in part maintained by the engagement of flange 66 and blister 30. As discussed, retaining element 62, in the form of flange 66, may be configured such that once a consumer, or other user, detaches blister 30 from blister card 28, flange 66 no longer functions to retain lenticular lens member 26 to blister pack 24; however, other structure may be incorporated into assembly 20 that is configured to retain lenticular lens member 26 to blister pack 24, or a portion thereof, even after separation of blister 30 and blister card 28.

Lenticular lens member 26 may additionally or alternatively include a retaining element 62 in the general form of a retaining clip 68. Retaining clip 68 may be configured to extend over and/or engage an edge 70 of blister card 28 as generally shown in the depicted embodiment of FIG. 1.

Now that the embodiment illustrated in FIGS. 1 and 2 has been fully described, various other embodiments of assembly 20 are described below. Those elements in common with the above described embodiment are identified by like numerals.

Figure 3:
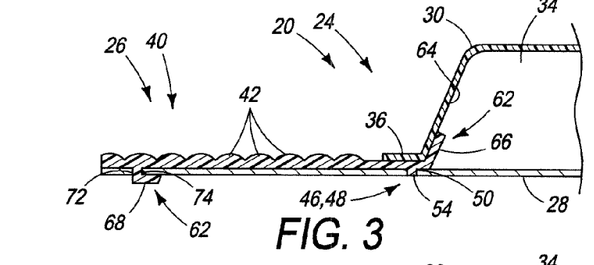
FIG. 3 is a fragmentary cross-sectional side elevation view of another embodiment of a blister pack assembly.

Turning now to FIG. 3, a slight variation of the embodiment described above is illustrated in cross-section. As shown, blister card 28 may include a retaining slot 72 configured to receive a retaining clip 68, such that retaining clip 68 extends over and/or engages an edge 74 of retaining slot 72, rather than the edge of the blister card as discussed above. Such configuration may be referred to as a snap-fit configuration. Attachment of lenticular lens member 26 to blister pack 24 may be at least in part maintained by the engagement of clip 68 and edge 70 or edge 74. Engagement between retaining clip 68 and edge 70 or edge 74 may further aid in maintaining registration of lenticular lens array 40 with indicia 32.

Figure 4:
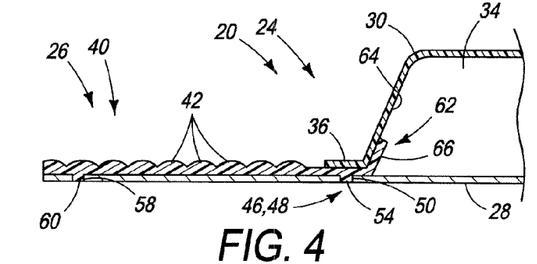
FIG. 4 is a fragmentary cross-sectional side elevation view of another embodiment of a blister pack assembly.

Some embodiments of assembly 20 may include a lenticular lens member 26 with both a flange 66 and a retaining clip 68 as depicted in the embodiment of FIGS. 1 and 2 and the embodiment of FIG. 3. In other embodiments however, lenticular lens member 26 may include a flange 66 without further including a retaining clip 68, such as depicted in yet another embodiment in FIG. 4. In such embodiments, blister card 28 may include additional registration holes and lenticular lens member 26 may include corresponding additional registration pins. FIG. 4 illustrates both a third registration hole 58 and a third registration pin 60 as an example.

Other embodiments may include a retaining clip 68 without further including a flange 66. For example, lenticular lens member may at least in part be retained to blister pack 24 without flange 66 by simply being sandwiched between blister flange 36 and blister card 28.

Figure 5:
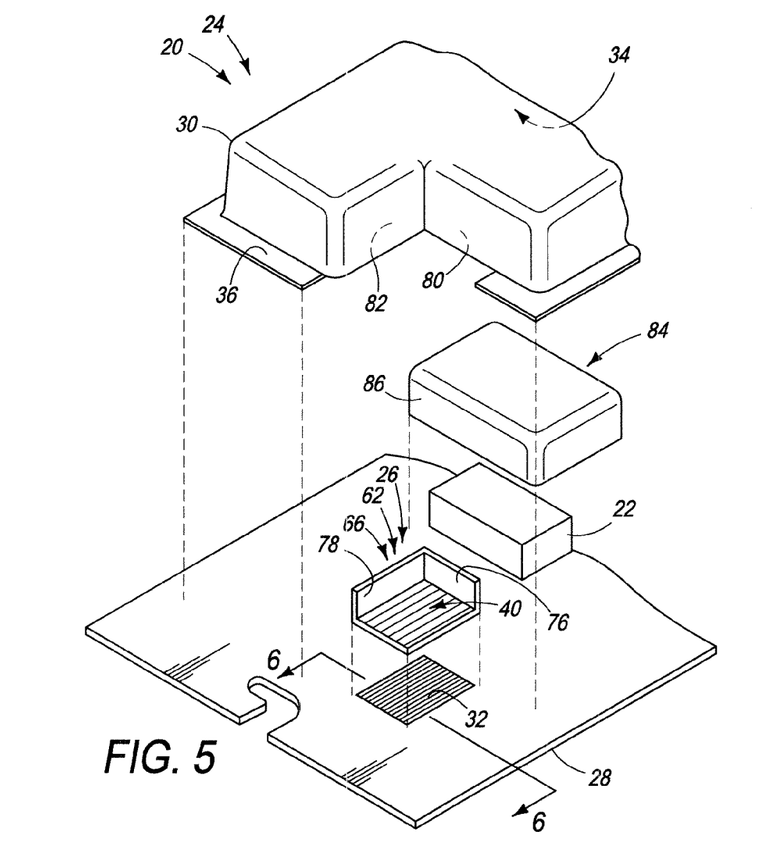
FIG. 5 is a fragmentary isometric exploded view of another embodiment of a blister pack assembly.
Figure 6:
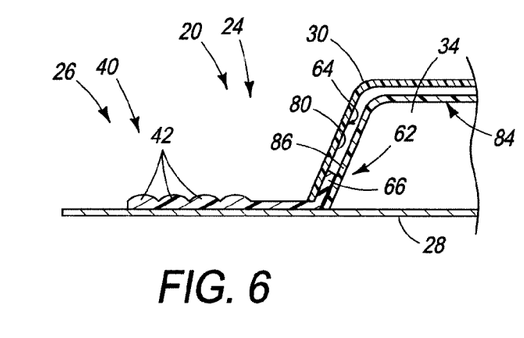
FIG. 6 is a fragmentary cross-sectional side elevation view of the embodiment of FIG. 5, taken generally along line 6-6 in FIG. 5.

Turning now to FIGS. 5 and 6, an embodiment of assembly 20 is depicted that does not incorporate the registration pins and holes of the embodiments of FIGS. 1-4 discussed above. As shown, lenticular lens member 26 may include a retaining element 62 in the general form of a flange 66 configured to extend within cavity 34 and engage inside surface 64. In some embodiments, as depicted in FIG. 5, flange 66 may include a first portion 76 and a second portion 78 configured to engage a first inside surface 80 and a second inside surface 82, respectively. In such embodiments, flange 66 and blister 30 make take any suitable shape. Flange 66 may have any suitable number of portions configured to engage any suitable number of inside surfaces. The embodiment depicted in FIGS. 5 and 6 includes a flange 66 and blister 30 such that first and second portions 76, 78 and first and second inside surfaces 80, 82 are generally at right angles to each other. Thus, functional alignment of lenticular lens array 40 with indicia 32 and retention of lenticular lens member 26 to blister pack 24 may at least in part be maintained by the engagement of flange portions 76, 78 (and any other portions that may be present) and inside surfaces 80, 82 (and any other surfaces that may be present), respectively.

As shown in FIGS. 5 and 6, blister pack 24, in conjunction with blister card 28 and blister 30, may further include a filler blister 84 configured to engage flange 66 of lenticular lens member 26. Stated differently, at least a portion of retaining element 62 may be interposed between blister 30 and filler blister 84. In embodiments where flange 66 includes first and second portions 76, 78, filler blister 84 may at least include a surface 86 configured to engage first portion 76. The filler blister may also however, include a surface configured to engage second portion 78. As discussed, flange 66 may have any suitable number of portions corresponding to any suitable number of inside surfaces. Likewise, filler blister 84 may also have any suitable number of surfaces corresponding to the portions of flange 66. Thus, functional alignment of lenticular lens array 40 with indicia 32 and retention of lenticular lens member 26 to blister pack 24, may at least in part be further maintained by the engagement of flange portions 76 (and any other portions that may be present) and surfaces 86 (and any other surfaces that may be present), respectively.

Figure 7:
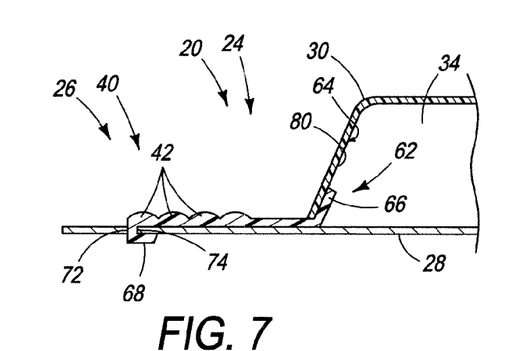
FIG. 7 is a fragmentary cross-sectional side elevation view of another embodiment of a blister pack assembly

Additionally or alternatively, and as shown in a slightly different embodiment in FIG. 7, lenticular lens member 26 may further include a retaining clip 68 configured to extend a retaining slot 72 such that retaining clip 68 extends over and/or engages an edge 74 of retaining slot 72 similar to the embodiment of FIG. 3 discussed above. Thus, attachment of lenticular lens member 26 to blister pack 24 may at least in part be maintained by the engagement of clip 68 and edge 74. Engagement between retaining clip 68 and edge 74 may further aid in maintaining registration of lenticular lens array 40 with indicia 32. In such embodiments, a filler blister as discussed above in relation to the embodiment of FIGS. 5 and 6 may therefore not be needed; however, one may be provided.

Figure 8:
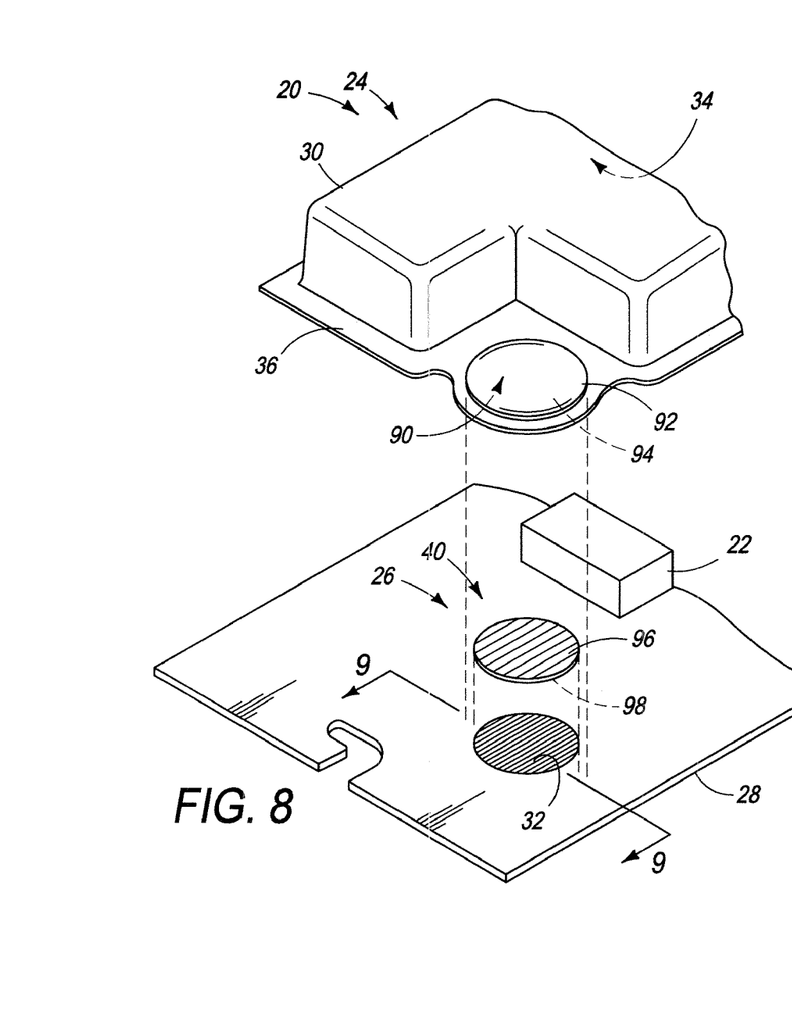
FIG. 8 is a fragmentary isometric exploded view of another embodiment of a blister pack assembly.
Figure 9:
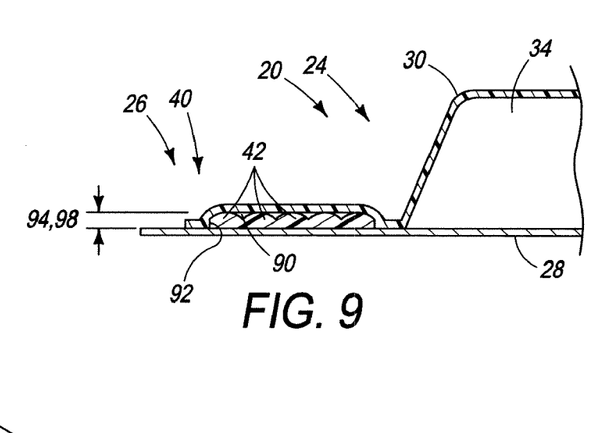
FIG. 9 is a fragmentary cross-sectional side elevation view of the embodiment of FIG. 8, taken generally along line 9-9 in FIG. 8.

Turning now to FIGS. 8 and 9, another embodiment of assembly 20 is depicted. In this embodiment, blister 30 includes a second cavity 90. Second cavity 90 may have a shape that generally corresponds to a shape of lenticular lens member 26, such that lenticular lens member 26 is retained within second cavity 90. Stated differently, second cavity 90 may have a periphery 92 and a depth 94 corresponding to a periphery 96 and a height 98 of lenticular lens member 26, respectively. Second cavity 90 and lenticular lens member may take any shape. For example, peripheries 92, 96 may be circular, ovular, rectangular, abstract, etc. In such embodiments, assembly 20 may (but is not required to) further include registration elements as discussed above in reference to FIGS. 1-4. Also, lenticular lens member 26 may be (but is not required to be) further attached to blister card 28 by an adhesive, or another suitable method of attachment, in addition to being retained by second cavity 90.

Figure 10:
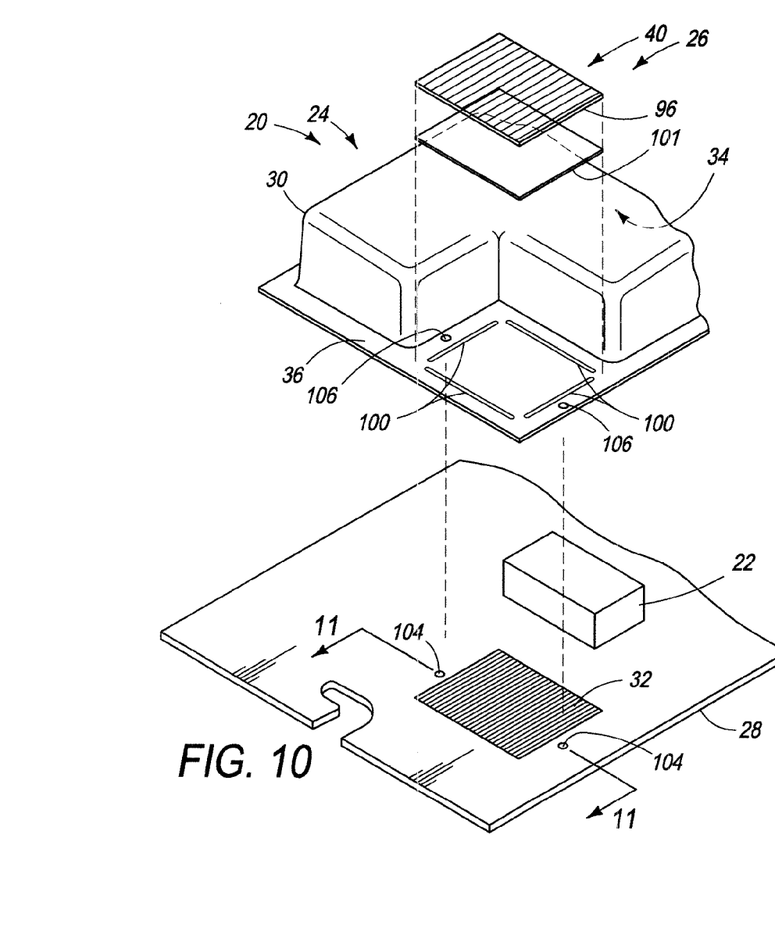
FIG. 10 is a fragmentary isometric exploded view of another embodiment of a blister pack assembly.
Figure 11:
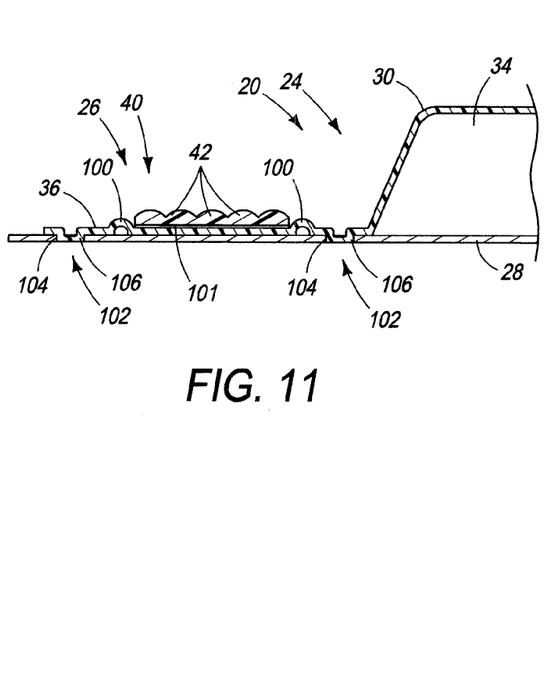
FIG. 11 is a fragmentary cross-sectional side elevation view of the embodiment of FIG. 10, taken generally along line 11-11 in FIG. 10.

FIGS. 10 and 11 illustrate an additional embodiment of assembly 20. As shown, blister 30 may include blister flange 36 extending generally peripherally about blister cavity 34 and configured to attach blister 30 to blister card 28. Blister flange 36 may include one or more raised alignment guides 100 in a shape generally corresponding to the periphery 96 of lenticular lens member 26. Lenticular lens member 26 may be attached to blister flange 36 and positioned within alignment guides 100. For example, as shown, lenticular lens member 26 may be attached to blister flange 36 by an optically clear adhesive film 101; however, any suitable method of attachment may be used.

Alignment guides 100 and periphery 96 may take any shape, such that they generally correspond to one another, and are configured such that functional alignment of lenticular lens array 40 with indicia 32 is at least in part maintained by the positioning of lenticular lens member 26 within alignment guides 100. The depicted embodiment of FIG. 10 includes alignment guides 100 and periphery 96 in a generally rectangular shape; however, as discussed, any suitable shape of alignment guides 100 and periphery 96 may be used. A single alignment guide 100 may be used that either fully encircles periphery 96 of lenticular lens member 26 or at least partially encircles periphery 96, or as depicted in FIG. 10, multiple alignment guides 100 may generally encircle or partially encircle periphery 96, such that functional alignment of lenticular lens array 40 with indicia 32 is at least in part maintained by the positioning of lenticular lens member 26 within alignment guides 100.

Blister card 28 and blister flange 36 may further include registration elements 102 configured to align lenticular lens array 40 with indicia 32 when lenticular lens member 26 is positioned within alignment guides. As depicted in FIGS. 10 and 11, registration elements 102 may include at least one registration recess 104 within blister card 28 and at least one registration projection 106 integral to blister flange 36 and configured to extend into at least one registration recess 104. Registration elements 102 may be any suitable shape. For example, as shown, registration projection 106 may be generally cylindrical and registration recess 104 may be generally circular in cross-section. Projection 106 may be (but is not required to be) slightly larger in diameter than recess 104, such that mating of projection 106 and recess 104 creates a press-fit configuration. Registration recess 104 is shown as passing completely through blister card 28; however, registration recess 104 is not required to pass completely through blister card 28.

Figure 12:
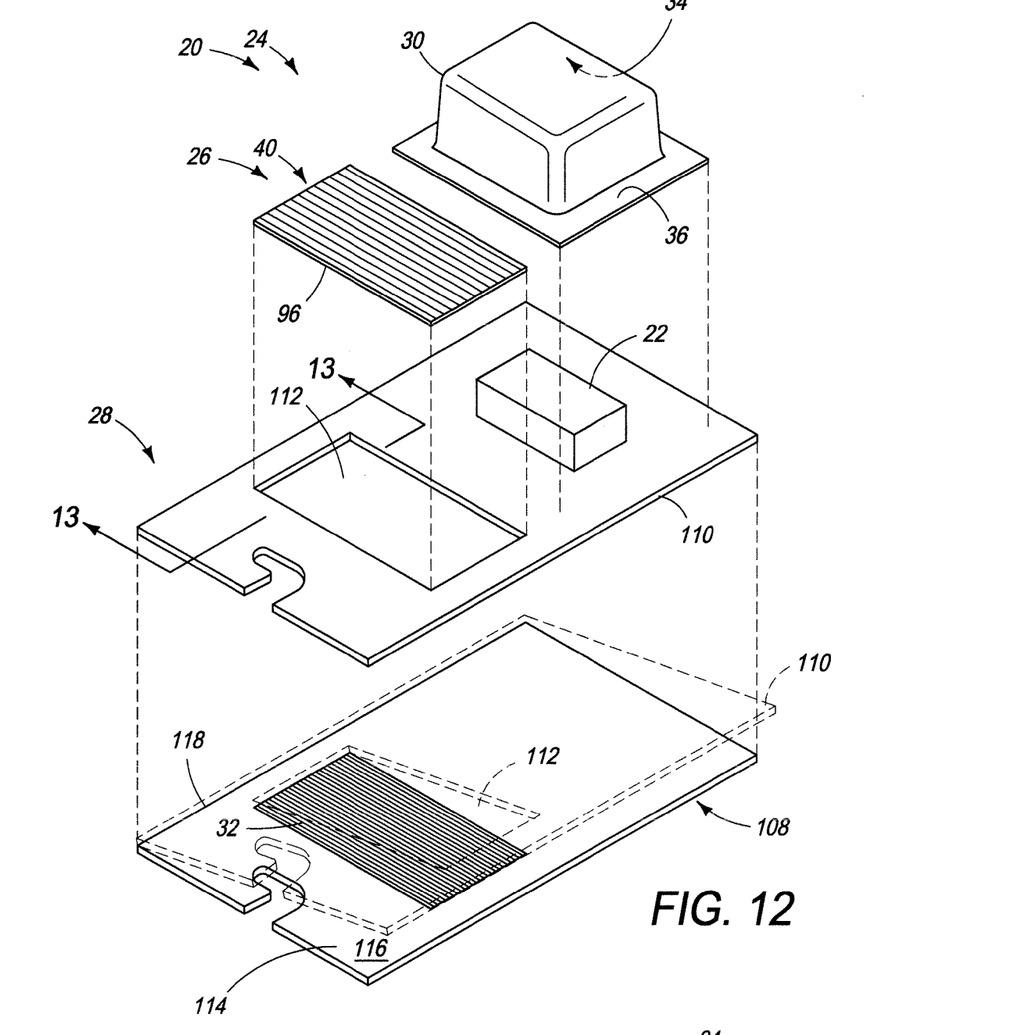
FIG. 12 is a fragmentary isometric exploded view of another embodiment of a blister pack assembly.
Figure 13:
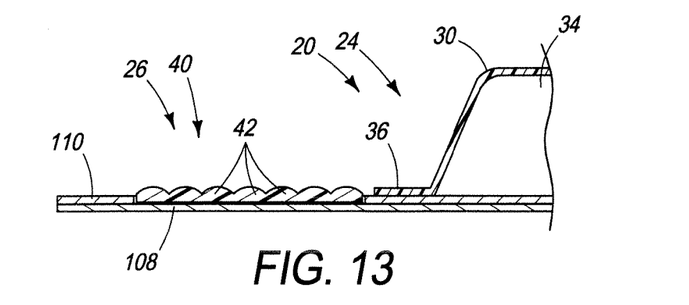
FIG. 13 is a fragmentary cross-sectional side elevation view of the embodiment of FIG. 12, taken generally along line 13-13 in FIG. 12.
Figure 14:
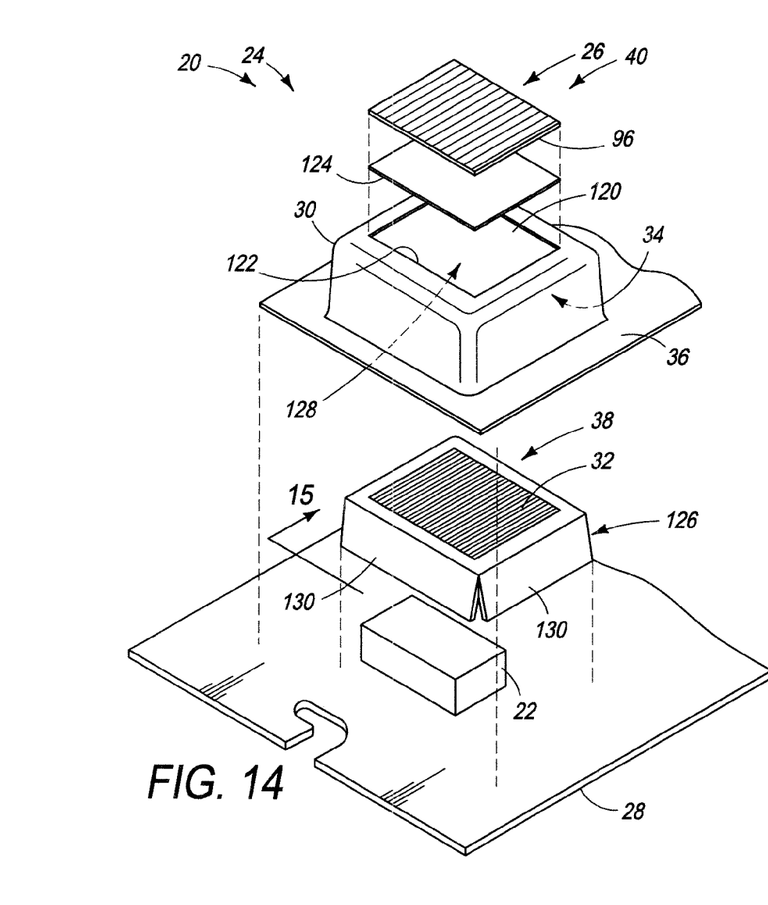
FIG. 14 is a fragmentary isometric exploded view of another embodiment of a blister pack assembly.
Figure 15:
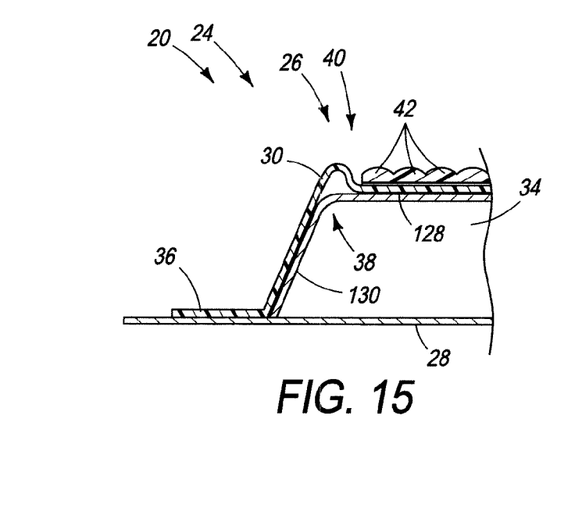
FIG. 15 is a fragmentary cross-sectional side elevation view of the embodiment of FIG. 14, taken generally along line 15 in FIG. 14. The right end of line 15 relative to FIG. 15 is not shown in FIG. 14.

A further embodiment of assembly 20 is illustrated in FIGS. 12 and 13. As shown, blister card 28 may include a first portion 108 and a second portion 110. Indicia 32 may be printed on first portion 108, and second portion 110 may include a passage, or window, 112 in a shape generally corresponding to periphery 96 of lenticular lens member 26 and positioned such that indicia 32 are positioned to be viewed through passage 112. Passage 112 and periphery 96 may take any shape. For example, as depicted, passage 112 and periphery 96 may be generally rectangular in shape.

First and second portions 108, 110 may be adhered, or otherwise attached, to one another with lenticular lens member 26 positioned within passage 112 and adhered, or otherwise attached, to first portion 108. Thus, functional alignment of lenticular lens array 40 with indicia 32 may at least in part be maintained by the positioning of lenticular lens member 26 within passage 112. In some embodiments, first portion 108 may include an inside surface 114 with a clear varnish coating 116 such that when heated, it is configured to act as an adhesive between first and second portions 108, 110, and between first portion 108 and lenticular lens member 26.

In some embodiments, first and second portions 108, 110 may (but are not required to) share a common edge 118, such that during manufacturing and assembly of assembly 20, first and second portions 108, 110 are simply folded together to form blister card 28, as shown in dashed lines in FIG. 12. Stated differently, first and second portions 108, 100 may share common edge 118 and may be adapted to be folded together to form blister card 28.

Turning now to FIGS. 14-17, additional embodiments of assembly 20 are illustrated incorporating an insert 38, with indicia 32 imprinted thereon, within blister cavity 34. Insert 38 may be paper, paperboard, cardboard, or any other suitable material. As shown, blister 30 may include a generally flat depression 120 with a periphery 122 in a shape generally corresponding to periphery 96 of lenticular lens member 26. Peripheries 96, 122 may be in any suitable shape such that functional alignment of lenticular lens array 40 with indicia 32 is at least in part maintained by positioning lenticular lens member 26 within depression 120. For example, the embodiment illustrated in FIG. 14 incorporates peripheries 96, 122 generally rectangular in shape, whereas the embodiment depicted in FIG. 16 incorporates peripheries 96, 122 generally pentangular in shape. Also, lenticular lens member 26 may be adhered, or otherwise attached, to blister 30 with an optically clear adhesive 124.

In embodiments where indicia 32 are imprinted on insert 38, additional structure is generally required to appropriately position indicia 32 in relation to lenticular lens member 26. For example, insert 38 may include structural elements 126 configured to position indicia 32 against an underside 128 of depression 120, as incorporated into the embodiment depicted in FIGS. 14 and 15. Structural elements 126 may be integral to insert 38. For example, insert 38 may include one or more flaps 130 that are folded at angles corresponding to a general shape of cavity 34, such that flaps 130 act to position indicia 32 against underside 126.

Figure 16:
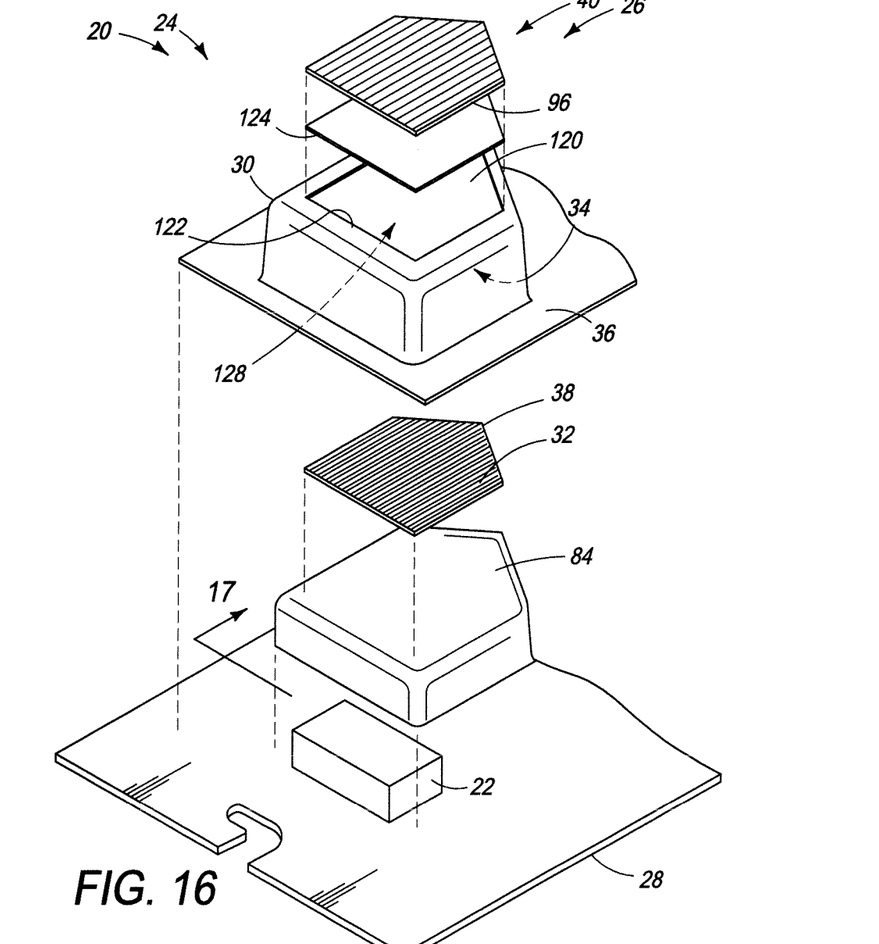
FIG. 16 is an isometric exploded view of another embodiment of a blister pack assembly.
Figure 17:
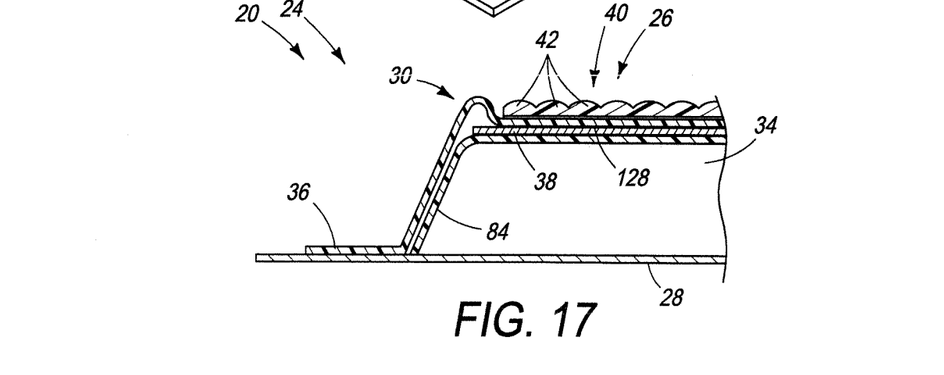
FIG. 17 is a fragmentary cross-sectional side elevation view of the embodiment of FIG. 16, taken generally along line 17 in FIG. 16. The right end of line 17 relative to FIG. 17 is not shown in FIG. 16.

In other embodiments, blister pack 24 may include a filler blister 84 configured to position insert 38, and thus indicia 32, against underside 128 as incorporated into the embodiment depicted in FIGS. 16 and 17. Stated differently, blister pack 24 may further include a filler blister 84 that positions indicia of lenticular art 32 against an underside 128 of depression 120 of the blister. In yet other embodiments, insert 38 may simply be adhered to underside 128 with adhesive, or any other suitable method, for positioning indicia 32 against underside 128.

It is believed that the disclosure set forth herein encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, properties and/or methods disclosed herein. Similarly, where the disclosure or the claims recite "a" or "a first" element or the equivalent thereof, such disclosure and claims should be understood to include incorporation of one or more such elements, neither requiring nor excluding two or more such elements.

It is believed that the following claims particularly point out certain combinations and subcombinations of features, functions, elements, properties, and/or methods that may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:
1. A blister pack assembly for packaging merchandise, comprising:
   a blister pack including:
      a blister card having front and rear surfaces defined by a peripheral edge, and including at least one registration element disposed on the front surface of the blister card, spaced from the edge;
      a blister attached to the blister card, the blister defining a cavity for retaining merchandise; and
      indicia of lenticular art; and
   a lenticular lens member attached to the blister pack, the lenticular lens member including a lenticular lens array functionally aligned with the indicia of lenticular art, at least one corresponding element in registration with the at least one registration element on the front surface of the blister card, and a retaining element configured to retain the lenticular lens member to the blister pack and restrict removal of the lenticular lens member therefrom; wherein the retaining element extends within the cavity of the blister;
   wherein functional alignment of the lenticular lens array with the indicia of lenticular art is fixedly maintained by mating of the registration elements.

2. The assembly of claim 1, wherein the indicia of lenticular art are printed on the blister card.

3. The assembly of claim 1, wherein the retaining element includes a retaining clip that extends over an edge and at least partially over the rear surface of the blister card.

4. A blister pack assembly for packaging merchandise, comprising:
   a blister pack including:
      a blister card having front and rear surfaces defined by a peripheral edge, the blister card including at least one registration element disposed on the front surface of the blister card, spaced from the edge, and further including a retaining slot;
      a blister attached to the blister card, the blister defining a cavity for retaining merchandise; and
      indicia of lenticular art; and
   a lenticular lens member attached to the blister pack, the lenticular lens member including a lenticular lens array functionally aligned with the indicia of lenticular art, and at least one corresponding element in registration with the at least one registration element on the front surface of the blister card, and a retaining element configured to retain the lenticular lens member to the blister pack and restrict removal of the lenticular lens member therefrom; wherein the retaining element is a retaining clip that extends into the retaining slot; and wherein functional alignment of the lenticular lens array with the indicia of lenticular art is fixedly maintained by the mating of the registration elements.

5. The assembly of claim 4, wherein the lenticular lens member further includes a retaining element that extends within the cavity.

6. The assembly of claim 5, wherein:
the blister pack further includes a filler blister; and
at least a portion of the retaining element of the lenticular lens member is interposed between the blister and the filler blister.

7. The assembly of claim 5, wherein the lenticular lens member further includes a retaining clip that extends over an edge of the blister card.

8. A blister pack assembly for packaging merchandise, comprising:
a blister pack including:
a blister card;
a blister attached to the blister card, the blister defining a cavity for retaining merchandise; and
indicia of lenticular art; and
a lenticular lens member attached to the blister pack, the lenticular lens member including a lenticular lens array functionally aligned with the indicia of lenticular art, and a retaining element that extends within the cavity.

* * * * *